United States Patent [19]
Park

[11] Patent Number: 5,737,139
[45] Date of Patent: Apr. 7, 1998

[54] DIGEST VARIABLE SPEED REPRODUCING APPARATUS FOR A VIDEO CASSETTE RECORDER AND METHOD THEREFOR

[75] Inventor: Jae Wan Park, Kyungki-do, Rep. of Korea

[73] Assignee: Goldstar Co., Ltd., Seoul, Rep. of Korea

[21] Appl. No.: 688,679

[22] Filed: Jul. 29, 1996

Related U.S. Application Data

[63] Continuation of Ser. No. 362,274, Dec. 22, 1994, abandoned.

[30] Foreign Application Priority Data

Dec. 22, 1993 [KR] Rep. of Korea ............... 29111/1993

[51] Int. Cl.$^6$ ........................................... G11B 5/00
[52] U.S. Cl. ..................... 360/8; 360/32; 386/75; 386/76
[58] Field of Search ............... 360/8, 36.1, 36.2, 360/27, 32; 358/335, 340; 386/65, 51, 68, 75, 76, 77, 95, 96

[56] References Cited

U.S. PATENT DOCUMENTS

| | | |
|---|---|---|
| 4,301,480 | 11/1981 | Kitamura ..................... 360/8 |
| 4,376,874 | 3/1983 | Karban et al. ............... 360/8 X |
| 4,392,161 | 7/1983 | Ota et al. ..................... 360/10.3 |
| 4,562,488 | 12/1985 | Koyama et al. ............. 360/8 |
| 4,734,795 | 3/1988 | Fukami et al. ............... 360/8 |
| 5,303,093 | 4/1994 | Kawasaki ..................... 360/30 |

*Primary Examiner*—Andrew L. Sniezek
*Attorney, Agent, or Firm*—Finnegan, Henderson, Farabow, Garrett & Dunner, L.L.P.

[57] ABSTRACT

A digest variable speed reproducing apparatus for a video cassette recorder (VCR) including a system controller for supplying a desired variable speed data; a control signal detector for detecting a control signal written onto a VCR tape together with an audio signal during digest variable speed reproduction, from the VCR tape; a variable speed controller for supplying A/D conversion execution signal and D/A conversion execution signal and for supplying write control signal or read control signal only when a control pulse is detected by the control signal detector, in response to the variable data from the system controller; an A/D converter for converting a reproduced analog audio signal into a digital signal with a sampling rate corresponding to the variable speed data in response to the A/D conversion execution signal; a D/A converter for reconverting the digital signal read from a memory into an analog audio signal in response to the D/A conversion execution signal; and a memory for writing variable speed digital audio data output from A/D converter by a write control signal, or for reading digital audio data written by a read control signal at a speed prior to variable speed, thereby supplying the data to D/A converter.

2 Claims, 7 Drawing Sheets

PRIOR ART FIG. 2

DIGEST VARIABLE SPEED REPRODUCING APPARATUS FOR A VIDEO CASSETTE RECORDER AND METHOD THEREFOR

This application is a continuation of application Ser. No. 08/362,274, filed Dec. 22, 1994, now abandoned.

BACKGROUND OF THE INVENTION

The present invention relates to a digest reproducing apparatus by which a video signal is output at a variable speed and an audio signal is output at a normal speed during variable speed reproduction for a video cassette recorder (referred to as VCR hereafter). More particularly, the present invention relates to a digest reproducing apparatus for skipping the output of the digested audio signal in the portion where an audio signal is not recorded during variable speed reproduction thereof, and the method therefor.

The digest function performed during the variable speed reproduction for a VCR will now be briefly described. The video signal reproduced from a VCR tape by a reproduction head during a VCR variable speed reproduction mode is varied into a desired speed to be displayed on a screen. If an audio signal is also output via a speaker in a variable speed reproduction state, however, a user cannot hear any sound. Thus, even if the speed of the video signal is varied to a desired speed, the audio signal is always required to be output at the same number of times as the original processing speed.

Therefore, during a variable speed reproduction mode, the audio signal reproduced by a head is synchronized with the video signal whose speed is varied to a desired speed so that the audio signal cannot be output at a normal speed, thereby disabling the output in all but selected blocks. That is to say, the audio signal reproduced by the reproduction head is converted into a digital signal by an analog-to-digital (A/D) converter, with a sampling rate corresponding to the variable speed, and then stored in memory.

Thereafter, the audio signal which is varied in its speed and then stored in a memory is converted to an analog signal by a digital-to-analog (D/A) converter after being read from the memory with the sampling rate corresponding to a normal speed only in a selected block. The audio signal is output as sound via a speaker.

FIG. 1 is a schematic block diagram of a conventional digest reproduction apparatus for a VCR. The apparatus includes a system controller 1 for supplying a desired variable speed data and variable speed direction data and for controlling the overall operation of the VCR such as an audio double speed conversion mode; an A/D converter 2 for sampling and comparing sequential analog audio signals reproduced through a head to then convert the signals into digital signals; and a memory 3 for writing and reading the audio signals converted into digital signals. The conventional digest reproduction apparatus for a VCR of FIG. 1 further includes a memory controller 4 for supplying the memory 3 with a write or read address so that the audio signals converted into digital signals are written into the memory 3 or that the written audio digital signals are read out from the memory 3, for supplying the memory 3 with a write command signal or read command signal, or for outputting an execution signal such as an A/D conversion mode or a D/A conversion mode. The reproduction apparatus also includes a D/A converter 5 for converting the audio digital signal read from memory under the control of the memory controller 4 and outputting the converted signal, and an event controller 6 for controlling a sampling rate (or sampling frequency) so as to correspond with the desired variable speed of display in response to the variable speed data and variable speed direction output from the system controller 1 and for controlling the conversion execution point of time (event) of the A/D converter 2 and D/A converter 16 in response to the execution signals of A/D conversion mode and D/A conversion mode from the memory controller 4, thereby controlling the memory controller 4 so that the A/D conversion mode and D/A conversion mode are performed in accordance with a desired period.

In FIG. 1, the memory controller 4 and event controller 6 are collectively referred to as a variable speed controller 7. The A/D converter 2, event controller 6, D/A converter 5, memory controller 4 are integrally formed within an audio variable speed converting apparatus (labeled as 15 in FIG. 2) in one chip. The system controller 1 and memory 3 are peripheral devices of the audio variable speed converting apparatus 15. The construction of FIG. 1 will be described in more detail with reference to FIG. 2 which is a block diagram of the apparatus shown in FIG. 1.

In FIG. 2, the A/D converter 2 shown in FIG. 1 includes an amplifier 8 for amplifying an audio signal read from a VCR tape by an audio reproduction head with a proper gain; a field effect transistor (FET) 9 for sampling the amplified audio signal as a sampler; a sequential comparator 10 having a plurality of resistances $R_1$ to $R_{2n}$, a capacitor $C_1$ and a comparator $IC_1$, for comparing the audio signals sampled through the FET 9 sequentially in a preset order; and an A/D converter 11 for converting analog audio signals sequentially compared by the sequential comparator 10 into n-bit digital signals.

Also, according to FIG. 2, a reset 12 for initializing the audio variable speed converter 15 is installed externally in the audio variable speed converter 15 when power is on and variable speed data is changed. A system controller 1 for outputting an overall control signal for a VCR system such as variable speed data (including variable speed direction) or audio speed conversion execution data is installed externally in the audio variable speed converter 15.

Also, the event controller 6 shown in FIG. 1 includes as shown, in FIG. 2, a special data read 6a for reading variable speed data and variable speed direction data output from the system controller 1 of the VCR shown in FIG. 2 and data for turning on/off audio variable speed conversion mode to then output to the event controller 6b or for outputting a signal for initializing the audio variable speed converting apparatus 15 to then output to the reset 12 when the variable data and variable speed direction data are converted; and an event controller 6b for receiving control signals of the system controller 1 such as variable data, variable speed direction data, or data for turning on/off audio variable speed conversion mode through special data read 6a and controlling sampling rates corresponding to the variable speed of a screen, i.e., video signal, for the A/D converting portion 2 and D/A converting portion 5.

Also, according to FIG. 2, in addition to the above components, there is further provided a memory 3 for writing audio digital data (m×n) converted into digital signals by the A/D converting portion 2 onto m addresses in units of n bits, or for reading out the written digital data; a memory controller 4 for controlling the memory 3 so as to set an address of the memory 3 by a control signal of the event controller 6b, thereby writing audio digital data converted by the A/D converting portion 2 onto corresponding address of the memory 3 and reading the written audio digital data, and for outputting A/D conversion mode execution signal and D/A conversion mode execution signal to the event controller 6b; and a D/A converting portion 5 for converting audio digital signal read from the memory 3 by the memory controller 4 and then outputting the converted analog audio signal to the speaker. Here, the D/A converting portion 5 includes a D/A converter 13, a plurality of resistances $R_{2n+1}$ to $R_{4n}$, and a low-pass filter 14. The memory controller 4 includes a memory control portion 4a; a write counter 4b for counting addresses in order to set a write address while writing A/D converted audio digital data in a memory 3, to then output the counted address to the memory 3; and a read counter 4c for counting addresses in order to set a read address while reading audio digital data stored in the memory 3, to then output the counted address to memory 3.

In FIG. 2, reference SW1 is a switch for switching the audio signal to go ground when not being output to speaker during a mute mode.

The operation of the digest reproducing apparatus for the conventional VCR will be described with reference to FIG. 2 and FIG. 3. First, if power is turned on, the reset 12 initializes the audio variable speed converting apparatus 15. Then, the special data read 6a receives variable speed data, variable speed direction data, and audio variable speed conversion mode execution on/off data supplied from the system controller 1 of the VCR.

The special data read 6a outputs the received variable speed data, variable speed direction data, and audio variable speed conversion mode execution on/off data to the event controller 6b and at the same time outputs a restart signal of a low state when a previous audio variable speed data is different from the current one, e.g., when variable speed is changed or the on/off status of audio speed conversion mode is changed, to then initialize the audio variable speed converting apparatus 15 (Step 1S).

The event controller 6b which has received the variable speed data, variable speed direction data, and audio variable speed conversion mode start 'on' data through the special data read 6a controls A/D conversion event period and D/A conversion event period in response thereto. Therefore, when each event period falls on, A/D conversion execution signal (ADC.ST) for starting A/D conversion is output to the A/D converting portion 2 and D/A conversion execution signal (DAC.ST) for starting D/A conversion is output to the D/A converting portion 5 (Step 2S).

However, the event controller 6 outputs the A/D conversion execution signal (ADC.ST) or D/A conversion execution signal (DAC.ST) only when A/D conversion mode execution signal or D/A conversion mode execution signal input from the memory controller 4 are 'on', respectively, and an audio variable speed converting apparatus driving signal input from the special data read 6a is turned on.

A/D conversion event frequency (i.e., sampling rate), and D/A conversion event frequency, (i.e., sampling rate), which are converted in accordance with a desired variable speed are expressed in the following table 1. That is to say, the event controller 6b allows the A/D converting portion 2 to perform an A/D conversion with a (n×xHz) event frequency, and allows the D/A converting portion 5 to perform a D/A conversion with an xHz event frequency when an image varies at a speed of n times the variable speed.

Therefore, the image is displayed on the screen n times as fast as the normal speed. However, D/A converted and output audio signal is output as an audio signal of normal speed.

TABLE 1

| Picture variable speed | A/D conversion frequency | D/A conversion frequency |
|---|---|---|
| x 1 | xHz | xHz |
| x 2 | 2 x xHz | . |
| x 3 | 3 x xHz | . |
| . | . | . |
| . | . | . |
| . | . | . |
| x n | n x xHz | . |

Therefore, when VCR variable speed reproduction is faster than the normal speed, A/D conversion period (sampling rate) is shorter than D/A conversion period.

The A/D converting portion 2 which has received A/D conversion execution signal ADC. ST from the event controller 6b outputs a sampling gate pulse value corresponding to picture variable speed to a gate electrode of a sampling and holding FET 9 so that the analog audio signal amplified in a predetermined amplifying degree is sampled and held via the sampling and holding FET 9 after being reproduced through the head.

The sampled and held analog audio signal is sequentially compared in the sequential comparator 10, and thereafter, is converted into an n-bit digital signal by the A/D converter 11. The A/D converter 11 outputs the n-bit audio digital signal to the memory 3 and, at the same time, inputs a write control signal WRT.ST for writing the audio digital data in the memory 3 to the memory control portion 4.

Then, the memory control portion 4 instructs the memory 3 to write the n-bit audio digital signal thereon, and controls such that the corresponding write address is output to the memory 3 by the write counter 4b, thereby writing the audio digital data in the corresponding address of the memory 3 (Step 3S). At this time, the output write addresses are output from 0 to m, with its initial value as 0, and with one added per counting period by the write counter 4b so that $W_{count} = W_{count} + 1$.

Meanwhile, if the D/A conversion execution signal DAC.ST is input to the memory control portion 4 from the event controller 6b, the memory control portion 4 instructs the memory 3 to read (output) the n-bit written data and, at the same time, forms the address from which data are to be read by means of the read counter 4c to then supply to the D/A converting portion 5.

At this time, there are differences in read address outputs depending on the variable speed reproduction direction. That is to say, in the case of the forward variable speed direction, the memory controller 4 initializes the read counter 4c to zero, reads the written audio digital data in the same order as that during writing, and then controls D/A converting portion 5 for a D/A conversion (Step 4S). In the case of the reverse variable speed direction, the memory controller 4 initializes the read counter 4c as a maximum value, reads the written audio digital data in the reverse order as that during writing, and then controls the D/A converting portion 5 for a D/A conversion (Step 5S). At this time, when the audio digital signal read by the memory controller 4 is converted into an analog audio signal in the D/A converting portion 5, the signal is changed at a normal reproduction speed to then be output, as described above.

In order to remove noise, the output analog audio signal passes through the switch $SW_1$ via the low-pass filter 14 to then be output to the speaker.

In a mute mode, the switch $SW_1$ transmits the analog audio signal changed at a normal reproduction speed and output to ground, so that the mute operation is performed.

However, according to the aforementioned conventional digest reproducing apparatus, the writing into memory of the audio digital signal obtained by A/D converting the audio signal reproduced during variable speed mode for a VCR is executed irrespective of whether the audio signal has been written onto the VCR tape or not. Therefore, when the VCR tape portion where a normal audio signal is not recorded is intended to be digest-variable speed reproduced, noise is produced in outputting the digested audio signal.

SUMMARY OF THE INVENTION

To solve the above problem, it is an object of the present invention to provide a digest variable speed reproducing apparatus for eliminating noise by skipping the writing in a memory of the audio signal of the VCR tape portion where an audio signal is not recorded, during variable speed reproduction thereof, and the method therefor.

To accomplish the above object, the digest variable speed reproducing apparatus according to the present invention includes: a system controller for supplying a desired variable speed data; a control signal detector for detecting a control signal recorded onto a VCR tape together with an audio signal during digest variable speed reproduction, from the VCR tape; a variable speed controller for supplying A/D conversion execution signal and D/A conversion execution signal and for supplying write control signal or read control signal only when a control pulse is detected by the control signal detector, in response to the variable data from the system controller; an A/D converter for converting a reproduced analog audio signal into a digital signal with a sampling rate corresponding to the variable speed data in response to the A/D conversion execution signal; a D/A converter for reconverting the digital signal read from a memory into an analog audio signal in response to the D/A conversion execution signal; and a memory for writing variable speed digital audio data output from A/D converter by a write control signal, or for reading digital audio data written by a read control signal at a speed prior to variable speed, thereby supplying the data to D/A converter.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
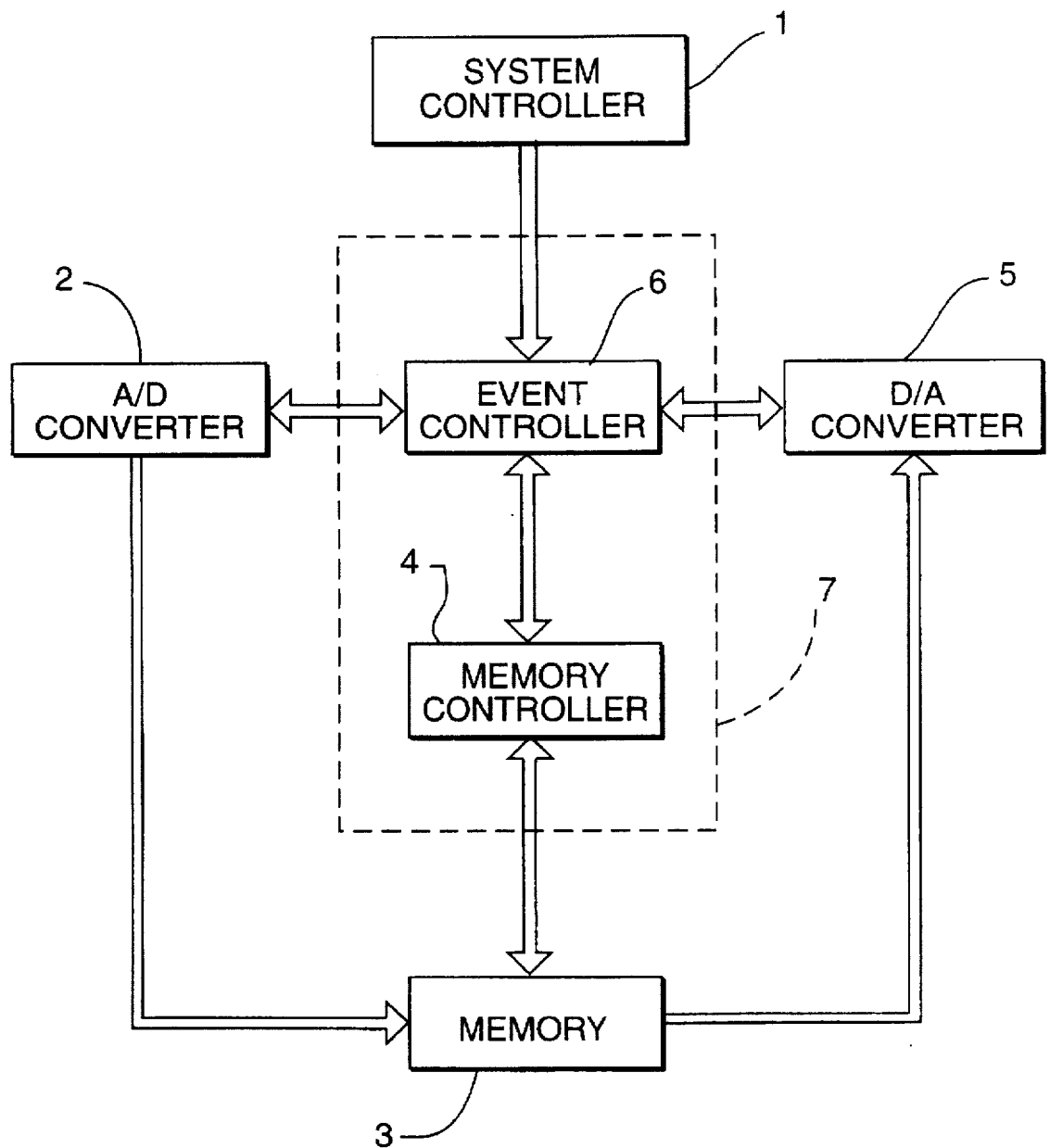
FIG. 1 is a schematic block diagram of a conventional VCR digest variable speed reproducing apparatus.
Figure 4:
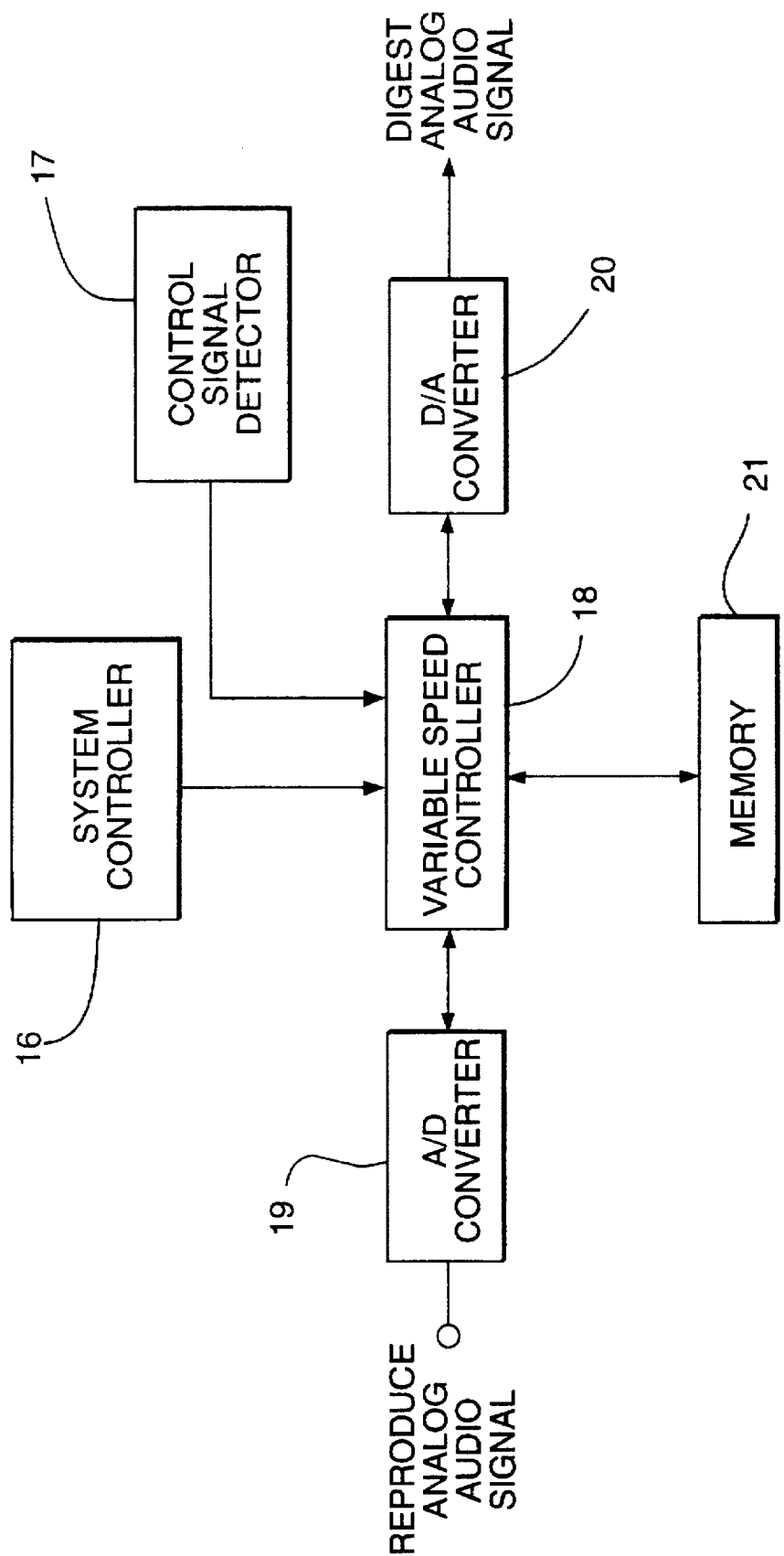
FIG. 4 is a schematic block diagram of a VCR digest variable speed reproducing apparatus according to the present invention.

The block diagram of FIG. 4 is almost the same as the schematic block diagram of FIG. 1 showing the conventional digest variable speed reproducing apparatus and is different only in that it further includes a control signal detector 17 for detecting a control signal recorded onto a VCR tape together with an audio digital signal during digest variable speed reproduction to then apply the detected control signal to the memory controller 23. That is to say, the digest variable speed reproducing apparatus shown in FIG. 4 includes a system controller 16 for supplying a desired variable speed data, i.e., a desired variable speed or variable speed direction; a control signal detector 17 for detecting a control signal recorded onto the VCR tape together with an audio signal during digest variable speed reproduction, from the VCR tape; a variable speed controller 18 for supplying A/D conversion execution signal and D/A conversion execution signal and for supplying write control signal or read control signal only when control pulse is detected by the control signal detector 17, in response to the variable data from the system controller 16; an A/D converter 19 for converting a reproduced analog audio signal into a digital signal with a sampling rate corresponding to the variable speed data in response to the A/D conversion execution signal; a D/A converting portion 20 for reconverting the digital signal read from a memory into an analog audio signal in response to the D/A conversion execution signal; and a memory 21 for writing variable speed digital audio data output from the A/D converting portion 19 by a write control signal, or for reading digital audio data prerecorded by a read control signal at a speed prior to variable speed, thereby supplying the data to D/A converting portion 20.

Figure 5:
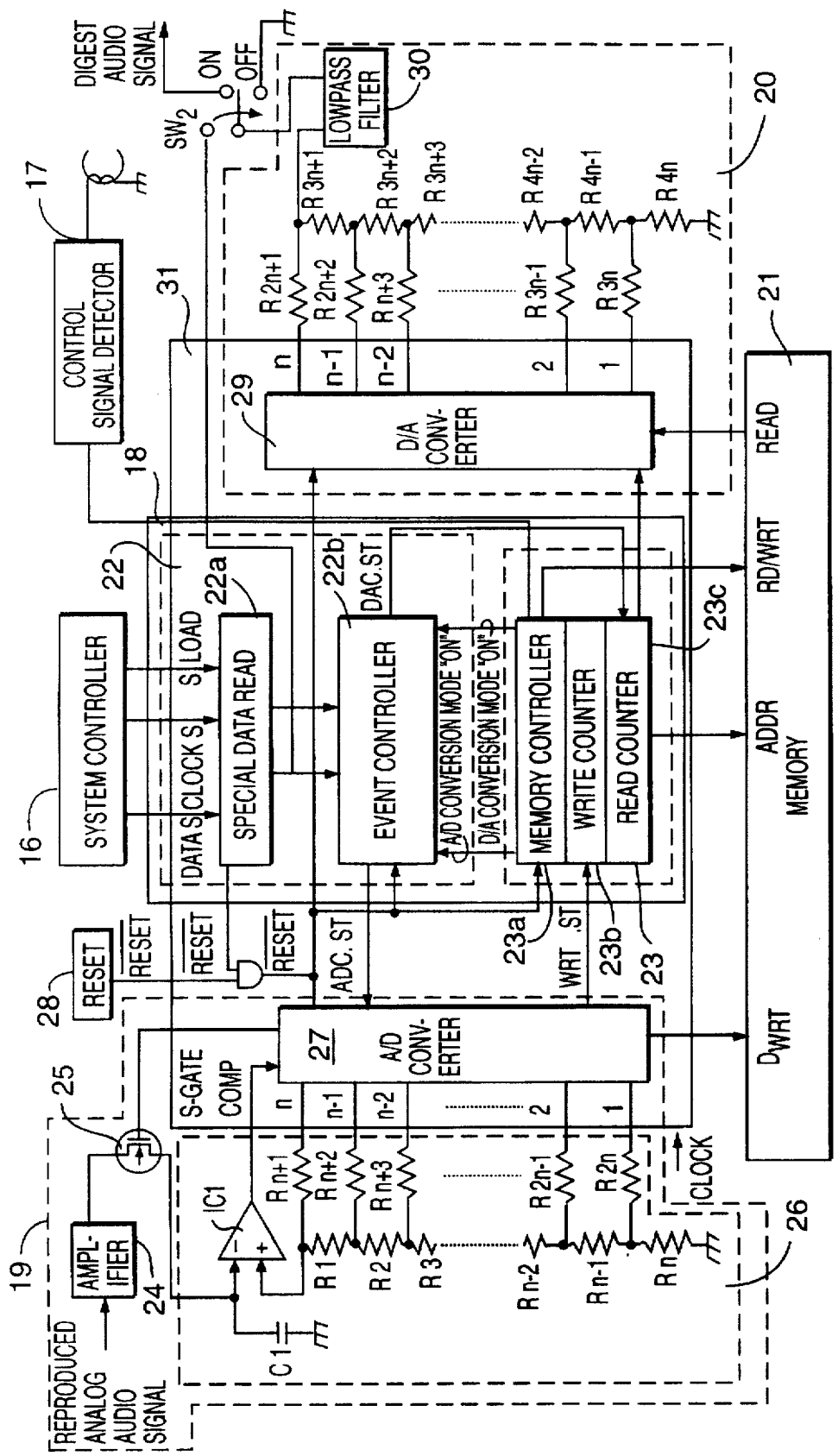
FIG. 5 is a detailed block diagram of a VCR digest variable speed reproducing apparatus according to the present invention.

FIG. 5 is a detailed block diagram of a VCR digest variable speed reproducing apparatus according to the present invention.

Figure 2:
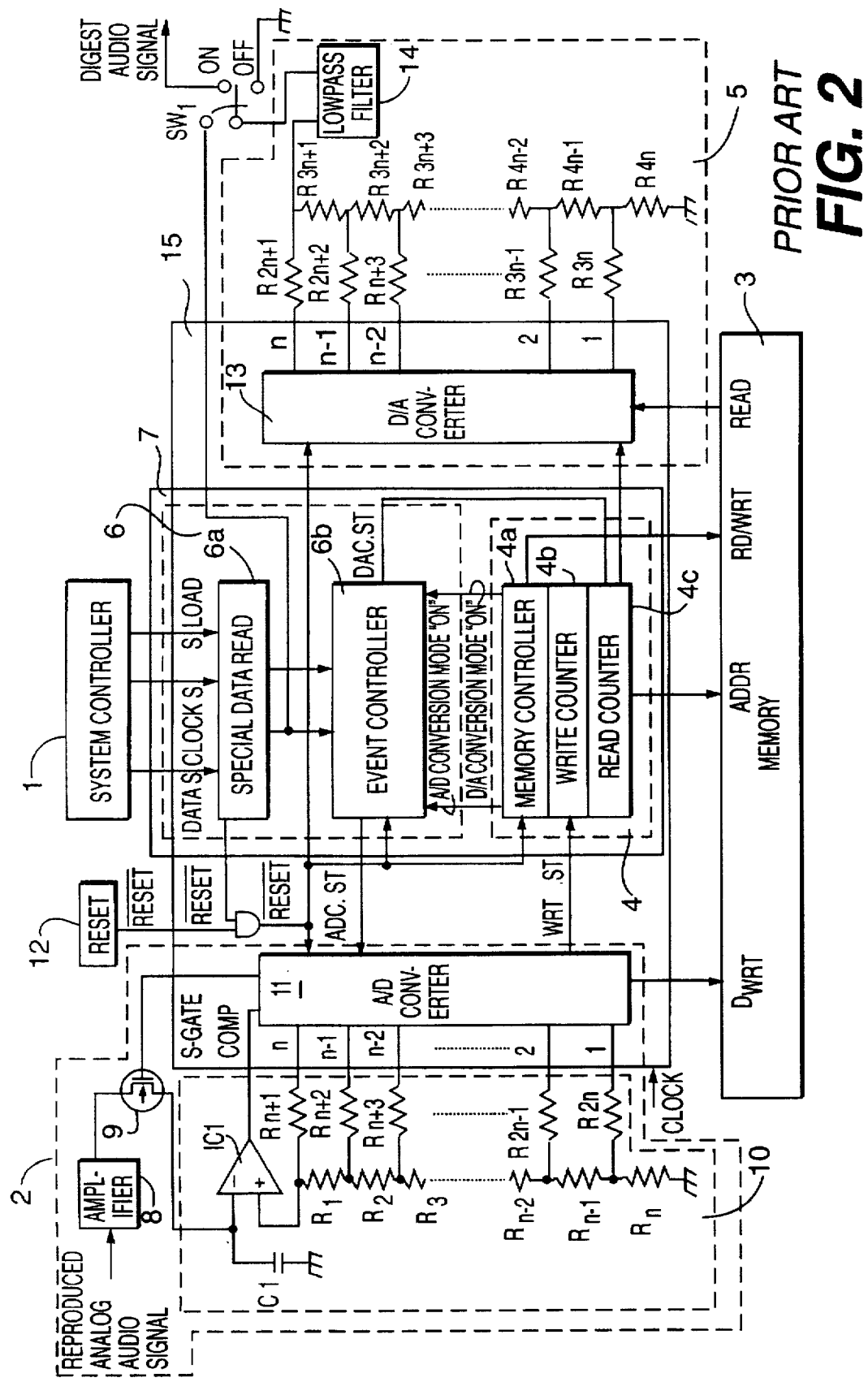
FIG. 2 is a detailed block diagram of a conventional VCR digest variable speed reproducing apparatus.
Figure 3:
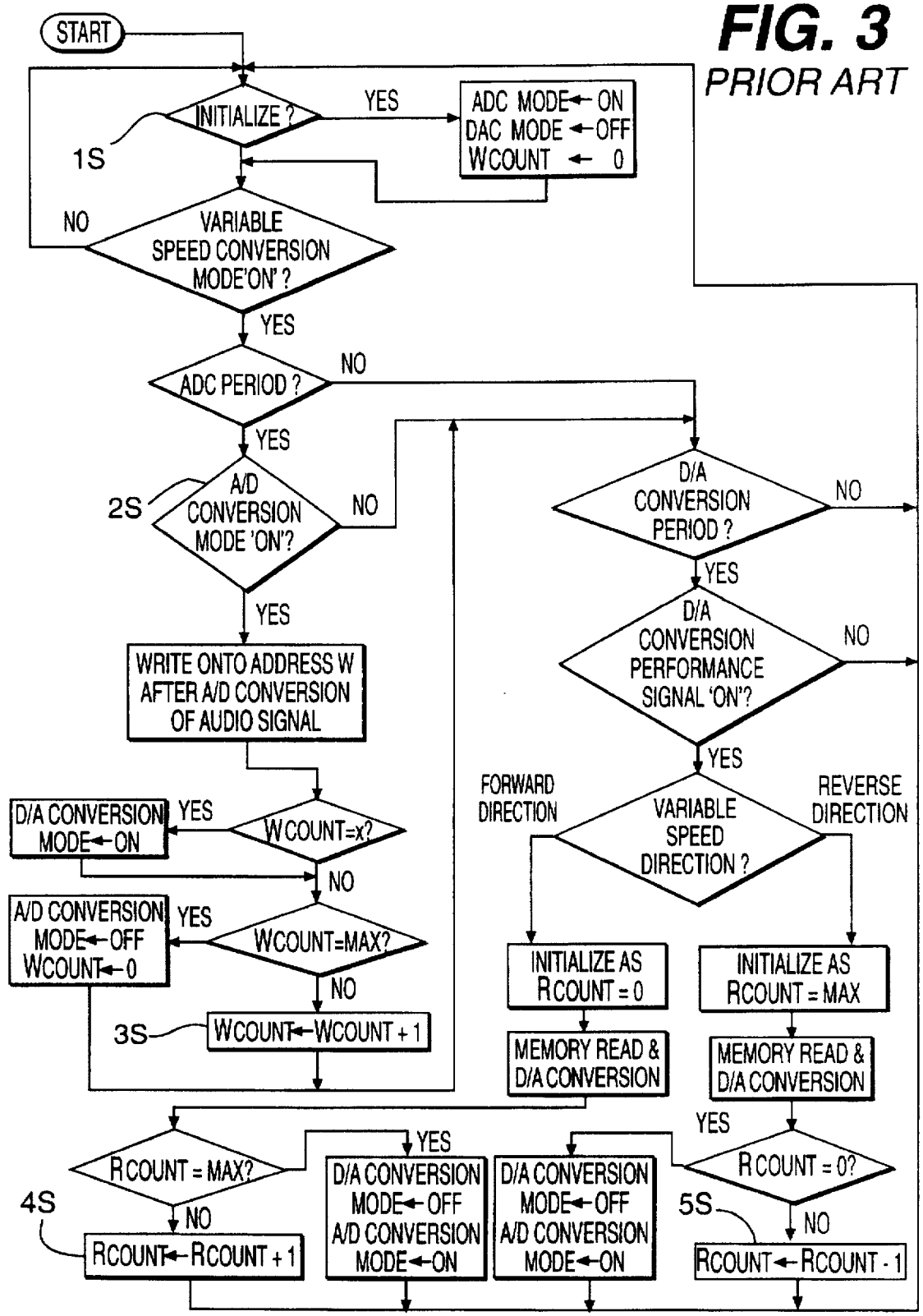
FIG. 3 is a detailed flowchart showing a conventional VCR digest variable speed reproducing method.

The variable speed controller of FIG. 4 (labeled as 18 in FIG. 5) includes an event control portion 22 for supplying A/D conversion execution signal and D/A conversion execution signal in response to the variable speed data (variable speed or variable speed direction) supplied from the system controller 16; and a memory control portion 23 for controlling memory such that the variable speed digital audio data output from A/D converter 19 is written in memory 21, or the digital audio data prerecorded in memory 21 is read only when a control signal is detected by control signal detector 17. Since the explanation of the other components are already made with regard to FIG. 2, their description will be omitted.

Figure 6:
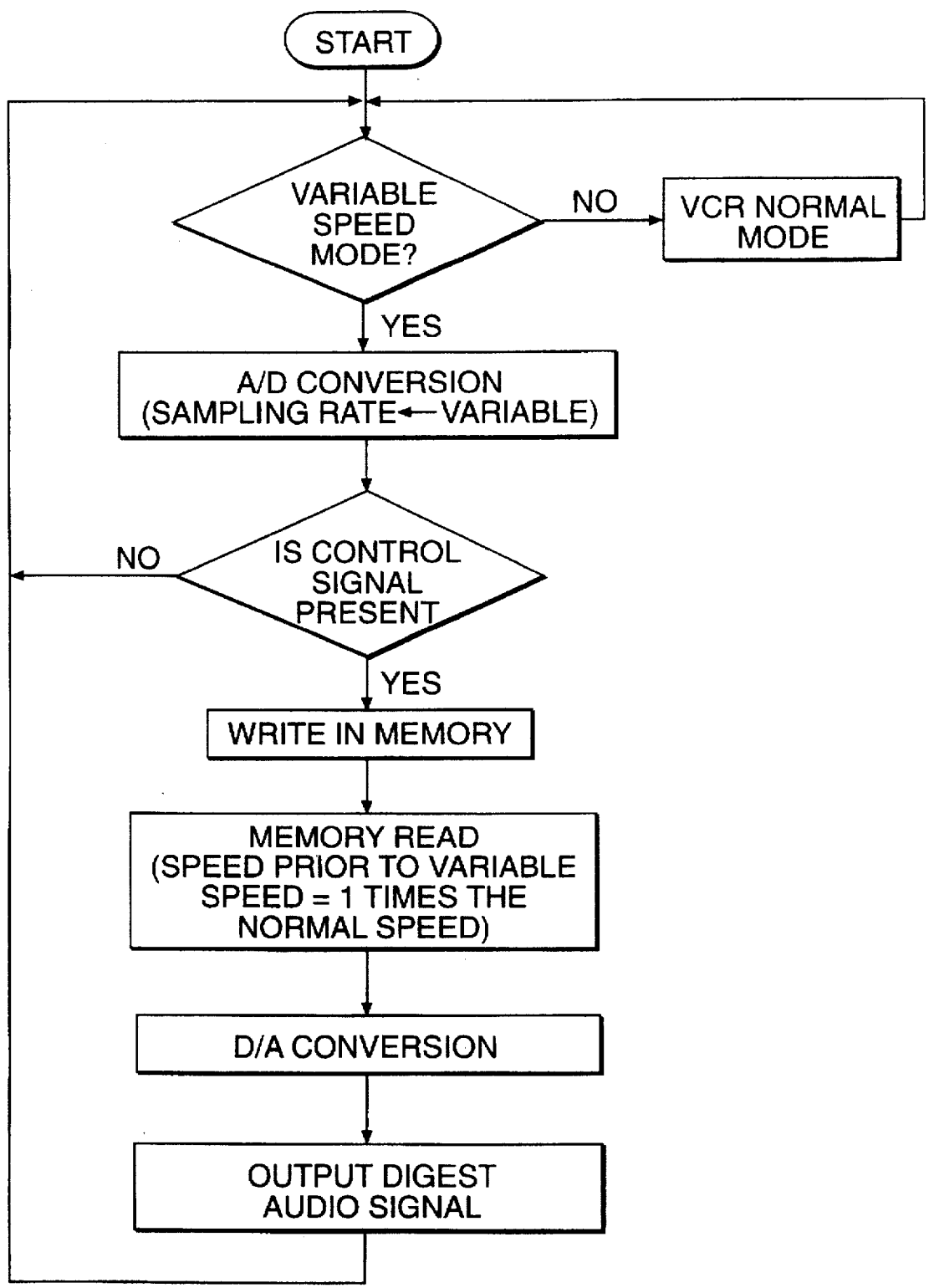
FIG. 6 is a flowchart showing a VCR digest variable speed reproducing method according to the present invention.

FIG. 6 is a flowchart showing the VCR digest variable reproducing method according to the present invention. According to FIG. 6, first, the current operation mode is checked to determine whether it is a digest variable reproduction mode or not.

If the current operation mode is not a digest variable reproduction mode, the digest normal reproduction mode is performed. If the current operation mode is a digest variable reproduction mode, the analog audio signal reproduced from the VCR tape is converted into a digital signal with the sampling rate corresponding to a desired variable speed.

At this time, while the audio signal is reproduced from the VCR tape, a control pulse may also be detected. If a control pulse is detected during reproduction of the audio signal, it is determined that the audio signal is recorded so that the digital signal is written in a memory. If a control pulse is not detected during reproduction of the audio signal, however, the process returns to the step of checking again whether the current operation mode is a variable reproduction mode or not, instead of storing the digital data in the memory.

Subsequently, as described above, the digital data written in the memory is read out from the memory at the same speed as the reproduction speed from the VCR tape, and then is converted into analog audio signal again. In this manner, the analog audio signal is amplified in a predetermined amplifying degree and then is output as a digest audio signal through the speaker.

Figure 7:
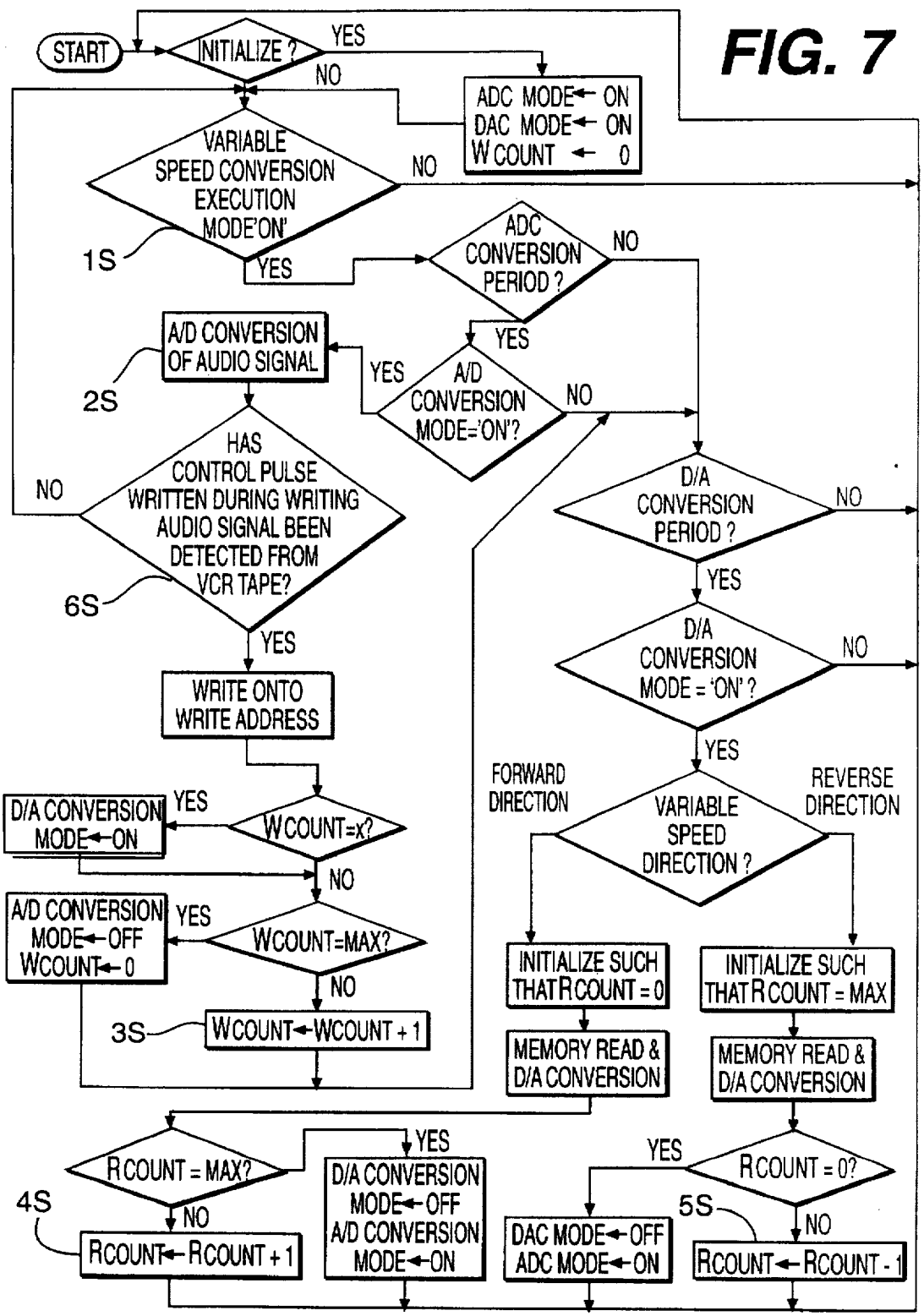
FIG. 7 is a detailed flowchart showing a VCR digest variable speed reproducing method according to the present invention.

The operation of FIG. 5 which is a detailed block diagram of the VCR digest variable reproducing apparatus according to the present invention will now be described with reference to FIG. 7. First, the system controller 16 checks whether the current operation mode is an initialization mode or not. If the current operation mode is an initialization mode, A/D mode is turned on, D/A mode is turned on, and write counter $W_{counter}$ is set as zero.

Successively, if the operation mode is a VCR variable speed conversion execution mode, the system controller 16 transmits the variable speed data to the event controller 22b, and the event controller 22b controls the corresponding A/D conversion event period and D/A conversion event period for a variable speed in response to the variable speed data. That is to say, when each event period falls on, the event controller 22b outputs A/D conversion execution signal (ADC.ST) for starting A/D conversion and D/A conversion execution signal (DAC.ST) for starting D/A conversion to A/D converting portion 19 (Step 2S).

The A/D converting portion 19 having received the A/D conversion execution signal (ADC.ST) from the event controller 22b outputs sampling and holding gate pulse corresponding to the picture variable speed to the gate of the sampling and holding FET 25 via A/D converter 27 so that the audio signal amplified by the amplifier 24 is sampled and held by the sampling and holding FET 25.

Thereafter, the sampled and held audio signal is sequentially compared in the sequential comparator 26 and is converted into an n-bit digital signal in the A/D converter 27 to then be output to the memory 21. At the same time, the A/D converting portion 19 applies a write mode execution signal WRT.ST for writing the digital data in the memory 21 to the memory control portion 23.

At this time, the memory controller 23 controls the memory 21 so that a control pulse written together with the writing of the audio signal is detected through the control signal detector 17 (Step 6S).

If the control pulse is detected by the control signal detector 17 and a write mode execution signal WRT.ST is input from the A/D converting portion 19, the memory controller 23 determines that the audio signal has been recorded onto a VCR tape and instructs the memory 21 to write the digital data thereon. Also, the memory controller 23 controls the memory 21 so that the write address is output to the memory 21 through the write counter 23b. Thereby, the digital data output from A/D converting portion 19 is written in the corresponding address of the memory 21 (Step 3S).

However, if the control pulse written together with the writing of the audio signal is not detected (Step 6S), the memory controller 23 determines that the audio signal has not been recorded onto a VCR tape and controls the memory 21 so that the digital data from the A/D converting portion 19 is not written in the memory 21.

Meanwhile, if D/A conversion mode execution signal DAC.ST is input from the event controller 22b and the control pulse is detected by the control signal detector 17, the memory controller 23 outputs a read mode execution signal to the memory 21 so that the n-bit digital data written in the memory 21 is read. At the same time, the memory controller 23 outputs the corresponding read address to the memory 21 via the read counter $R_{counter}$ 23c.

The digital data read from the memory 21 is input to the D/A converting portion 20. The D/A converting portion 20 converts the digital data into an analog data in response to a D/A conversion mode execution signal input from the event controller 22b in accordance with the corresponding D/A conversion event period.

Noise of the audio analog data is removed via a low-pass filter 30 and then is output through the speaker.

At this time, a switch SW2 switches such that the audio analog data is output to ground during mute operation and the audio analog data is output to the speaker during normal variable speed reproduction.

As described above, according to the present invention, the presence or absence of the recorded audio signal is determined by detecting a control pulse from the VCR tape, thereby allowing the A/D converted digital data not to be written in the memory in the portion where the audio signal is not recorded. In this way, noise is not produced in outputting the digest reproduced audio signal.

What is claimed is:

1. A digest variable speed reproducing method for a video cassette recorder (VCR), wherein certain audio portions of a VCR tape are not stored during a digest variable speed reproduction, comprising the steps of:

providing a desired variable speed data by a system controller;

detecting either a presence or absence of a first analog audio signal in response to respective presence or absence of a control signal on the VCR tape;

providing an A/D conversion execution signal to an A/D converter and a D/A conversion execution signal to a D/A converter in response to the detected presence of the control signal, and not supplying the A/D conversion execution signal to the A/D converter and the D/A conversion execution signal to the D/A converter in response to the detected absence of the control signal;

converting the first analog audio signal from the VCR tape into a digital audio signal with a sampling rate corresponding to the desired variable speed data in response to the A/D conversion execution signal;

storing said digital audio signal in a memory at a speed corresponding to the desired variable speed data in response to the detected presence of the control signal, and not storing the digital audio signal in response to the detected absence of the control signal;

converting the stored digital audio signal into a second analog audio signal in response to the D/A conversion execution signal; and reading the second analog audio signal from said memory at a normal speed while a video signal is output at a speed corresponding to the desired variable speed data.

2. A digest variable speed reproducing apparatus for a video cassette recorder (VCR), wherein certain audio portions of a VCR tape are not stored during a digest variable speed reproduction, comprising:

a system controller for supplying a desired variable speed data;

a signal detector for detecting either a presence or absence of a first analog audio signal in response to respective presence or absence of a control signal on the VCR tape;

an A/D converter for converting the first analog audio signal into a digital audio signal with a sampling rate corresponding to the desired variable speed data;

a memory for storing the digital audio signal at a speed corresponding to the desired variable speed data in response to the detected presence of the control signal, and not storing the digital audio signal in response to the detected absence of the control signal;

a D/A converter for converting the digital audio signal from the memory into a second analog audio signal; and a variable speed controller supplying an A/D conversion execution signal to said A/D converter and a D/A conversion execution signal to said D/A converter in response to the detected presence of the control signal, for reading the second analog audio signal from the memory at a normal speed while a video signal is output at a speed corresponding to the desired variable speed data, and not supplying the A/D conversion execution signal to said A/D converter and the D/A conversion execution signal to the D/A converter in response to the detected absence of the control signal by said signal detector.

* * * * *